United States Patent [19]

Panda et al.

[11] Patent Number: 4,849,142
[45] Date of Patent: Jul. 18, 1989

[54] SUPERPLASTIC FORGING OF ZIRCONIA CERAMICS

[75] Inventors: Prakash C. Panda; Edgar R. Seydel; Rishi Raj, all of Ithaca, N.Y.

[73] Assignees: Jupiter Technologies, Inc.; Cornell Research Foundation, Inc., both of Ithaca, N.Y.

[21] Appl. No.: 816,075

[22] Filed: Jan. 3, 1986

[51] Int. Cl.[4] .............................................. C04B 33/32
[52] U.S. Cl. .................................. 264/40.6; 264/40.1; 264/65; 264/325; 264/332
[58] Field of Search .................. 264/1.2, 65, 325, 332, 264/40.1, 40.6

[56] References Cited

U.S. PATENT DOCUMENTS 4,279,655 7/1981 Garvie et al. ........................ 264/65
4,410,468 10/1983 Packer .................................. 264/1.2

OTHER PUBLICATIONS

Wang, J.-G., and Raj, R., J. American Ceramic Society, vol. 67, No. 6, pp. 385–390, 399–409 (Jun. 1984).
Buckley, P. L., Air Force Wright Aeronautical Labs, Report No. AFWAL-TR-82,2028, 8/82, Wright Patterson AFB, Ohio.
Clark, T. J. et al, Am. Ceram. Soc. Bull., 61(7), 733–6 (1982).
Curci, T. J. et al, Materials Science Research, v. 11, Process of Cryst Ceram Proc of the Univ Conf on Ceram Sci, 14th, NC State Univ 11/7-9/1977, pp. 359–368.
Dey, S. et al, Am Ceramic Soc. Bull, 64(4) 571–5 (1985).
Handwerker, C. A. et al, Adv. Ceram, 1983 No. 6, pp. 213–223, C.A. 101:42391n.
Knickerbocker, J. U. et al, v. 37, n 1–4, Pt 3, 1981, Int. Meet on Ferroelectr, IMF-5, 5th, University Park, PA, 8/17-21, 1981, pp. 733–736.
Knickerbocker, J. U., Department of Energy Report DOE/ER/01198-1396 (1982).
Maguire, E. A. et al, Am Ceram Soc Bull, 60(2) 255 (1981).
Rhodes William H., et al, Avco Missiles Space and Electronic Group Lowell Mass Avco Space Systems DIV Report No. AVSSD-0415-67-RR, 30 Jun. 1967.
Sakata, K. et al, Ferroelectrics v. 22 n 1–2, 1978 Proc. of the Int. Meet on Ferroelectr, 4th, Leningrad, USSR, 9/18-23, 1977, pp. 821–824.
Smethurst, E. IEEE Transactions on Magnetics v. MAG-6, n.3, 9/70, p. 618.
Takenaka, T. et al, Proc Jpn Congr. Mater Res, 20th, Kyoto Jpn. 9/1976, published by Soc of Mater. Sci, Kyoto, Jpn, 1977, pp. 212–214.
Takenaka, T. et al, Japanese Journal of Applied Physics, v. 19, No. 1, 1/80, pp. 31–39.
Takenaka, R. et al, Japanese Journal of Applied Physics, 20 (Supp. 20–4), 189–92, 1981.
Takenaka, T. et al, J. Appl. Phys, 55(4), 1092–9 (1984).
Wang, D. et al, J. Chinese Silicate Society, 10(4), 427–437, 1982, C.A.98:184391f.
Xia, A, et al, Wuli, v. 13, No. 8, pp. 484–485 (1984), C.A. 102:83221w.
Alper, A. M., High Temperature Oxides, Part II, Academic Press (1970), pp. 117–166.

List continued on next page.

*Primary Examiner*—James Derrington

[57] ABSTRACT

The invention relates to producing relatively flaw free zirconia ceramic shapes requiring little or no matching by superplastic forging of a fully sintered or partially sintered preform. The preform is prepared by providing a starting powder comprising by weight from about 70% to about 100% zirconia and from about 0 to about 30% of stabilizing additives, e.g. commerically available TZ-3Y powder, cold pressing to obtain a preform of green density ranging from about 30% of theoretical density to about 75% of theoretical density and partially or fully sintering at atmospheric pressure, e.g. in argon or air at a temperature ranging from about 900° C. to about 1900° C. The superplastic forging is carried out by isothermally pressing the partially or fully sintered preform into substantially final shape utilizing a temperature and strain rate such that surface cracks do not occur, e.g. utilizing a temperature of 1310° C., a substantially constant displacement rate based on an initial strain rate of $7 \times 10^{-3}$ seconds $^{-1}$ and open die or closed die processing in a graphite or metal die.

10 Claims, 3 Drawing Sheets

OTHER PUBLICATIONS of American Society for Metals, vol. 62, No. 1, pp. 291-293 (3/69).

Alper, A. M., High temperature Oxides, Part III, Academic Press (1970), pp. 235-281.

Baudelet, B. Superplasticity, Conference Internationale, Grenoble, France, 9/16-19/1985, pp. 16.1-16.19.

Brissette, L. A., et al., J. Amer. Ceramic Soc., vol. 49, No. 3, pp. 165-166. (3/66).

Burke, J. J., et al., Advances in Deformation Processing, pp. 405-421, Plenum Press, NY, 1978.

Hart, J. L., et al., Material Res. Bull., vol. 2, pp. 521-526, 1967, Pergamon Press, pp. 521-526

Heuer, A. H., et al., J. of American Ceramic Society, vol. 52(9), pp. 468-474 (1969).

The Japan Economic Journal, 7/23/85, p. 16.

Panda, P. C., Ph.D. Thesis Titled "Studies on Phase Transformation Kinetics Superplastic Deformation and Dynamic Recrystallization of Magnesia-Alumina Spinel, $MgO.2Al_2O_3$," Cornell University, NY 8/84.

Rhodes, W. H., et al., J. of the American Ceramic Society, vol. 58, No. 1-2, pp. 31-34 (1-2/75).

Rice, R. W., et al., Ceramic Engineering and Science Proceedings, Jul.-Aug. 1984, The American Ceramic Society, pp. 530-545.

Stevens, R., "An Introduction to Zirconia", Magnesium Elektron Ltd., Flemington, NJ, undated.

Woodford, D. A., Transactions Quarterly, Transactions

SUPERPLASTIC FORGING OF ZIRCONIA CERAMICS

TECHNICAL FIELD

The field of this invention is fabricating zirconia ceramic parts for high temperature use, particularly ones with axisymmetric shapes, e.g. bearings, extrusion dies, gas-turbine disks, valves, cutting tools, cutting blades, knife edges, and the like.

BACKGROUND OF THE INVENTION

Zirconia ($ZrO_2$) exhibits three well defined polymorphs: The monoclinic phase (stable up to 1170° C.), the tetragonal phase (stable from 1170° C. to 2370° C.), and the cubic phase (stable from 2370° C. to melting point of 2680° C.). Another polymorph, the orthorhombic phase also exists and is usually found at high pressures. The tetragonal phase can be retained at room temperature. The interest in zirconia stems from the fact that under service conditions, the tetragonal zirconia can transform to monoclinic phase by stress induced transformation thereby arresting crack propagation. This is usually called transformation toughening. Detailed description of importance and significance of zirconia ceramics can be found in *Advances in Ceramics Science and Technology of Zirconia*, vol. 3 (1981), (eds. A. H. Heuer and L. W. Hobbs) and vol. 12 (1984) (eds. N. Claussen, M. Ruhle and A. Heuer), Am. Ceram. Soc., Inc., Columbus, Ohio; R. C. Garvie, "*Zirconium Dioxide and some of its Binary Systems*", in High Temperature Oxides, Vol. II, ed. A. M. Alper, pp. 118-166; R. Stevens, "*An Introduction to Zirconia*", Magnesium Elecktron Ltd., Flemington, NJ.

By adding stabilizing oxides such as yttria ($Y_2O_3$), calcia (CaO), magnesia (MgO), other rare earth oxides to zirconia either partially stabilized zirconia (which is a mixture of cubic, tetragonal and/or monoclinic), or fully tetragonal zirconia or fully stabilized zirconia (which is mostly cubic phase) can be obtained depending upon the amount of additive and method of preparation. Ideally the stabilizing additive should be distributed uniformly and this is accomplished by appropriate powder preparation. Starting powder preparation can be carried out by dry mixing or wet mixing. Wet mixing is usually done either by sol-gel techniques, or by co-precipitation of hydroxides, or by hydrolysis of chlorides or organometallics, etc. . . . There are partially or fully stabilized zirconia powders available commercially, for example, from Toyo Soda Manufacturing Company, Ltd. Tokyo, Japan and Magnesium Elektron Inc., NJ.

The conventional methods for fabricating zirconia ceramic parts are pressureless sintering, hot-isostatic pressing, and hot pressing.

Pressureless sintering is accompanied by non-uniform shrinkage which makes it impossible to meet close tolerances without subtantial machining.

Hot-isostatic pressing requires the use of a cladding to separate the pressurizing gas from pores of the powder compact or a precalcination to create an impervious structure and produces product where flaws are generally reduced in size but still retained.

Hot pressing normally is utilized to press into pancake or billet shapes which are machined into final shape.

SUMMARY OF THE INVENTION

It is intended to provide a process herein where materials can be formed which are relatively flaw free and have relatively good uniformity and homogeneiety utilizing conditions which can be well controlled while allowing control of densification, reactions and grain growth at temperatures below those required by normal sintering means.

It has been discovered herein that zirconia ceramic parts are formed to final shape with little or no machining and without the need for use of cladding by superplastic forging of a fully sintered or partially sintered preform. When operating on a partially sintered preform, the forging step also performs a sintering function in increasing density. Thus, the term sinter forging can be applied to the forging step herein.

The forging step in the process herein provides a high degree of reliability in respect to the ceramic components produced. In other words, the mechanical strengths of several forgings produced under the same conditions lie in a narrow range and are higher than are generally found for most sintered zirconia. This is at least in part because if a preform contains a defect in the shape of a spherical pore, then the deformation herein causes the pore shape to change to that of a disk or a needle, and the elongated or flattened pore shapes break up into small pores which are either removed by further densification or are too small to influence the strength of the ceramic.

The forging step in the process herein produces a different result from pressureless sintering and hot-isostatic pressing in that in respect to pores, it produces both a shape change (configuration change) and a volume change while said conventional processes produce only a volume change. For example, a spherical pore shrinks in volume but remains spherical in shape during pressureless sintering and hot-isostatic pressing. On the other hand, along with reduction in volume of a pore, the shear strain embodied in the instant process changes the shape of the pores as described above resulting in the aforedescribed reliability benefit.

The forging in the process herein produces a more uniform densification result than the conventional hot pressing process in respect to intricate shapes. This is because, in hot pressing, loose powder is pressed, and it may not densify uniformly in forming intricate shapes—this leads to poor uniformity in strength among products produced under the same conditions. On the other hand, in the forging step in the instant process a fully or partially sintered preform is used which can be designed to have a shape related to that of the final product so that flow of material during processing can be controlled to provide much more uniform results.

The instant process also is advantageous over the conventional hot pressing process in that the forging step herein can be carried out utilizing either a closed die or an open die whereas hot pressing is only carried out in a closed die. In open die forging, the quantity of the material need not be precisely controlled to obtain a precise shape of the finished part with only finish machining being necessary. Hot pressing requires material control and substantial machining.

The process herein comprises the steps of:
(a) providing a starting powder comprising by weight from about 70% to 100% zirconia and from 0 to about 30% of additives selected from the group consisting of $Y_2O_3$, CaO, MgO, $La_2O_3$, rare earth oxides (e.g. $Sm_2O_3$, $Gd_2O_3$, $Yb_2O_3$), sintering aid additives (e.g. organic binders) and mixtures thereof, (b) cold pressing to obtain a preform of green density ranging from about 1.8 (about 30% of theoretical density) megagrams per cubic meter to 4.6 (about 75% theoretical density) megagrams per cubic meter, (c) sintering in an inert atmosphere (e.g., argon) or in air or in vacuum at a temperature ranging from 900° C. to 1900° C. to obtain a density which ranges from about 50% to about 100% of theoretical density and which is higher than said preform green density, and (d) isothermally pressing the sintered preform to substantially final shape in air or an inert atmosphere or in vacuum utilizing a temperature within the range of about 1000° C. to 1900° C. and a strain rate within the range of about $10^{-7}$ to 1 seconds$^{-1}$ such that surface cracks do not occur, the said pressing being carried out to obtain a shear deformation greater than 30% whereby superplastic forging is effected. Such an amount of shear deformation is normally obtained by uniaxially pressing to reduce the vertical dimension of the specimen in the range of 30% to 60%.

As used herein the term "zirconia" means substantially pure zirconia as well as commercial grade zirconia which, for example, contains less than 2000 ppm by weight impurities such as alumina, silica, iron oxide, $Na_2O$, hafnia, titanium oxide, calcia and magnesia).

The term "shear deformation" is used herein to mean a change in configuration as distinguished from change only in volume.

The term "superplastic forging" is used to mean pressing under conditions wherein $1 \leq n \leq 4$ in the equation $$\dot{\epsilon} = C\sigma^n$$

wherein $\dot{\epsilon}$ is the strain rate, C is a constant related to the starting material, density of the packing and temperature and $\sigma$ is the stress. (See D. A. Woodford, "Strain-Rate Sensitivity as a Measure of Ductility", Transactions of American Society for Metals, 1969, Vol. 62, p. 291. See also J. W. Edington et al., "Superplasticity", Progress in Material Science, 21, No. 2, 1976, pp. 61-169). Under the conditions herein in isothermally pressing the preform of step (c) utilizing a temperature within the range of about 1000° C. to about 1900° C. and a strain rate ranging from about $10^{-6}$ seconds$^{-1}$ to about 1 seconds$^{-1}$ such that surface cracks do no occur, n always satisfies the relationship $1 \leq n \leq 4$ and superplastic forging thus occurs.

BRIEF DESCRIPTION OF THE DRAWING

In FIGS. 1-3, MPa stands for megapascals.

DETAILED DESCRIPTION OF THE INVENTION

Figure 1:
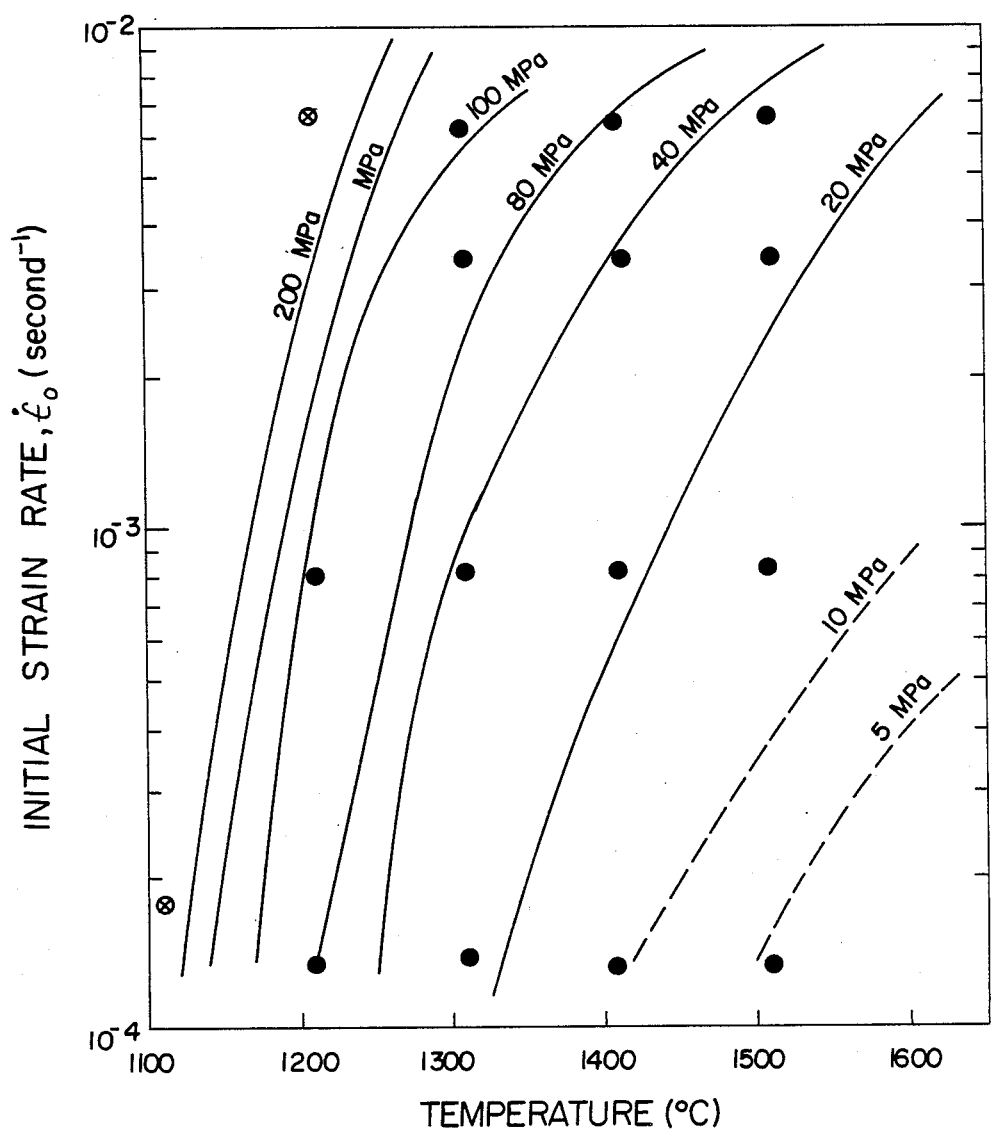
FIG. 1 is a graph of strain rate versus temperature and contains contours of constant flow stress and graphically presents results of the detailed working example herein.

We turn firstly to providing the starting powder, i.e. step (a) described above.

The zirconia ingredient is preferably utilized in an amount ranging from about 80% to about 100% by weight of the total ingredients (i.e. zirconia powder and additives). Typically it is employed as a finely divided pulverulent material having an average particle size ranging from about 0.002 $\mu$m to about 10.0 $\mu$m and preferably from about 0.002 $\mu$m to 1.0 $\mu$m.

Turning to the additives for the starting powder, which can be added in amounts sufficient to form a partially stabilized zirconia containing monoclinic, cubic and tetragonal phases or to form a fully tetragonal zirconia or to form a fully stabilized zirconia (cubic phases), these are preferably used in an amount ranging from 0 to 20% by weight of the total ingredients. Typically these are employed as a finely divided pulverulent material having an average particle size ranging from about 0.002 $\mu$m to about 10.0 $\mu$m and preferably from about 0.002 $\mu$m to about 1.0 $\mu$m.

To form the starting powder, in order to obtain a partially or fully stabilized zirconia, the ingredients are mixed and blended, for example, by dry mixing or by sol-gel techniques or by hydrolysis of organometallics or co-precipitation of hydroxides. The powder preparation methods besides dry mixing provide better uniformity in distribution of the stabilizing oxide particles. Ideally the stabilizing additive should be uniformly distributed on an atomic scale.

In a typical dry mixing process the various powders are suspended in a liquid vehicle, the admixture is milled and the vehicle is evaporated.

In a typical hydrolysis method, for example, the TZ-3Y process of Toyo Soda Manufacturing Co. Ltd., Tokyo, Japan, for producing yttria stabilized zirconia powders, solutions of zirconyl chloride ($ZrOCl_2 \cdot 8H_2O$) and yttrium chloride ($YCl_3$) are mixed and hydrolyzed to yield co-precipitates of zirconium hydroxide and yttrium hydroxide followed by distillation, drying, calcining, milling and spray drying.

In another wet mixing method, yttrium nitrate solution is added to zirconia and calcined at 1200° C., whereby the yttrium nitrate decomposes to give a skin of oxide on the zirconia which after further calcination at a higher temperature can be in the form of fine particles on the surface of the zirconia.

Starting powders are readily commercially available. These include, for example, TZ-3Y powder produced by Toyo Soda (as described above). The TZ-3Y powder contains about 5.06 wt. % ($\sim 3$ mol%) yttria as the stabilizer. The chief impurities in TZ-3Y powder are alumina ($Al_2O_3$), silica ($SiO_2$), iron oxide ($Fe_2O_3$) and $Na_2O$ and the total of these impurities is less than about 1000 ppm by weight.

The starting powder or material typically has a particle size typically ranging from about 0.002 $\mu$m to about 10 $\mu$m and preferably from 0.002 $\mu$m to about 1.0 $\mu$m. The TZ-3Y powder of Toyo Soda Co. has typical particle size of 0.025 $\mu$m.

Turning now to the cold pressing step, i.e. step (b) above, this is readily carried out, for example, by first cold compacting in a double action die to 7 to 50 megapascals and then enclosing the formed workpiece and cold isostatically pressing (i.e., using a device wherein pressure is transmitted via liquid, such as oil, to the workpiece which is surrounded by the liquid) to 100 to 350 megapascals. Preferably, this step is carried out to obtain a green density ranging from about 40% to about 65% of theoretical density.

Turning now to the sintering step, i.e. step (c) above, this step is preferably carried out at a temperature ranging from about 1000° C. to about 1800° C. in an inert atmosphere or in air to obtain a density which ranges from about 75% to about 95% of theoretical density. When the densities obtained are less than 75%, further densification is readily obtained in the forging step, i.e. in step (d) described above.

Turning now to the forging step, i.e. step (d) herein, this is preferably carried out at a temperature ranging from about 1000° C. to about 1900° C. in an inert atmosphere (e.g. argon) or in air utilizing an open die. The term "open die" is used herein to mean a die wherein on pressing the workpiece does not contact the die sidewall. A closed die (i.e. a die where on pressing the workpiece does contact the die sidewall) is also an alternative especially if the preform from sintering has a density less than 75% of theoretical density and minimizes the need for finish machining. Very preferably step (d) is carried out utilizing substantially the maximum strain rate where surface cracks do not occur and the minimum temperature where said substantially maximum strain rate produces no surface cracks. This minimizes processing time and energy requirements. The die material should be such that at the selected strain rate (or stress) and temperature, the die should not fracture or plastically deform and the die material should be able to withstand the environment. For example, graphite dies can be used only in inert atmosphere, whereas dies made of thoriated tungsten can be used in air with limited life.

Step (d) is readily carried out utilizing constant displacement rate, constant strain rate, constant load or constant stress.

The constant displacement rate method is readily carried out by placing the preform formed in sintering step (c) on a support structure (e.g. the bottom half of a die or a flat platen, preferably of graphite) in a furnace providing the appropriate temperature and utilizing a piston (e.g. a screw or hydraulic or pneumatic driven piston such that displacement rate is controllable) with the portion inside the furnace preferably of graphite to press the workpiece from above moving the piston at a constant displacement rate which is readily determined from the equation $$\dot{L} = \dot{\epsilon}_o h$$

wherein $\dot{L}$ is the displacement rate, $\dot{\epsilon}_o$ is the initial strain rate, and h is workpiece height and initial strain rate $\dot{\epsilon}_o$ preferably ranges from about $10^{-6}$ to about 1 seconds$^{-1}$ and is selected to be such that surface cracks do not occur. The term "displacement rate" is used herein to mean the relative rate of approach of the upper movable piston relative to the bottom piston or platform or other support structure. In this method the strain rate keeps increasing as the forging progresses. For example, if the initial strain rate is $10^{-3}$ seconds$^{-1}$, then strain rate increases to $2 \times 10^{-3}$ seconds$^{-1}$ (i.e. became twice the initial value) when the height of the preform or the workpiece is reduced by half the initial height.

The constant strain rate method is readily carried out utilizing apparatus as used for the constant displacement method wherein piston movement is controlled responsive to a microprocessor programmed to vary displacement rate as workpiece height decreases to maintain constant strain rate in accordance with the equation.

$$\dot{L} = \dot{\epsilon} h$$

wherein $\dot{L}$ is the displacement rate, $\dot{\epsilon}$ is strain rate and h is workpiece height. Preferably this method is carried out utilizing a a strain rate in the range of about $10^{-4}$ to about 1 seconds$^{-1}$.

The constant load method is readily carried out with the same apparatus as disclosed for the constant displacement method by moving the piston by a constant load force (utilizing a constant load weight positioned on the top piston in order to move it). The load P is readily calculated from the equation $P = 2\sigma A$ where A is the initial cross-sectional area of the workpiece (i.e. the cross-sectional area of the sintered preform) and the factor of 2 is used to account for the increase in area during the forging process as the preform gradually assumes the shape of the final part and $\sigma$ is the stress that corresponds to initial strain rates as set forth above for the constant displacement rate method.

The constant stress method is readily carried out with apparatus as described for the constant displacement method modified to include variable load applying means where varying of the load is controlled responsive to a microprocessor programmed to vary load as workpiece cross-sectional area increases to provide a constant stress in accordance with the equation $$P = \sigma A$$

where P is the load, $\sigma$ is stress and A is the cross-sectional area of the workpiece. Flow stress should preferably range from about 5 to about 200 megapascals.

In each of the four methods described above for step (d), the forging (i.e. pressing) is stopped when appropriate dimensions of the part being formed have been achieved as estimated from the total displacement applied to the piston utilized for the pressing.

As previously indicated the conditions of forging are selected so that no surface cracks occur in the workpiece. The term "surface cracks" is used herein to mean cracks visible to the naked eye as well as fine cracks that can be observed under magnification of 70X.

The conditions of forging are readily selected empirically, e.g. by deforming preform samples (i.e. already processed through the sintering step) at a plurality of strain rates and temperatures and determining whether cracks occur and graphing the results in terms of strain rates and temperatures and selecting strain rates and temperatures in the area of the graph where processed samples did not exhibit surface cracks. Typically, this can be carried out in uniaxial compression tests utilizing compression rods (i.e. push rods or pistons or anvils) and cylindrical preform specimens positioned with flat face against the compression rod.

In a preferred method of empirical determination, cylindrical preform samples (i.e. already processed through the sintering step) having a diameter ranging from about 5 to about 20 mm and a height ranging from about 5 to about 15 mm are forged (i.e. isothermally pressed by means of a constant displacement rate tester, e.g., an Instron Universal Testing machine manufactured by Instron Corporation, Canton, Mass., which machine is universally known as Instron Tester or Instron Machine, under open die conditions in a argon atmosphere in a furnace) in a range of constant temperatures and displacement rates (the piston attached to the crosshead of Instron Tester is moved at a selected constant displacement rate and a selected temperature is provided in the furnace) to reduce the height about 30% to about 60% and noting which of the samples are free of surface cracks and graphing the results in terms of initial strain rates determined from the equation $\dot{L}=\dot{\epsilon}_0 h$ (described hereinbefore) versus temperatures and selecting strain rates and temperatures for use in step (d) in the area of the graph where the processed samples did not exhibit surface cracks. Note that in this constant displacement rate method, strain rate keeps increasing during the forging process. Preferably step (d) is carried out utilizing an initial strain rate (in constant displacement rate forging) that is substantially the maximum one where no surface cracks were noted in the testing of the samples and at the minimum temperature where testing indicated said substantially maximum strain rate produces no surface cracks.

Recording of load and displacement during said testing provides data for making up stress vs. strain rate curves whereby the strain rates determined by testing are convertible to stress and load for use in carrying out step (d) by constant load and constant stress methods.

After step (d) is completed, some finish machining may be required to clean the edges. Close tolerances are obtained in open die processing by selection of preform shape and carrying out of step (c) to appropriate displacement. The processing provides uniform parts meeting close tolerances and containing a minimum of flaws. The parts demonstrate a high degree of reliability, i.e. uniformity in resistance to failure in use. Generally a produced part has an excellent surface finish and polishing is not necessary.

The process herein is illustrated in the following detailed example wherein convex lens shaped parts are obtained from intermediate cylindrical preforms.

EXAMPLE

Lens shaped parts were fabricated from yttria doped zirconia powder.

The starting powder was commercially available TZ-3Y powder of Toyo Soda Manufacturing Co., Tokyo, Japan. Besides zirconia this powder contains about 5.06 wt.% of $Y_2O_3$. The main impurities are $Al_2O_3$ (0.082 wt.%), $SiO_2$ (0.003 wt.%), $Fe_2O_3$ (0.003 wt.%), and $Na_2O$ (0.003 wt.%).

The powder was first cold-compacted in a double action die to 35 megapascals. The billets were then enclosed in latex balloons and cold isostatically pressed to 200 megapascals. The billets were round cylinders with a green density of 3.6 megagrams per cubic meter. The diameter ranged from 6 mm to 25 mm. The cold isostatically pressed billets were sintered in an argon atmosphere for 0.5 hours at 1250° C. This yielded specimens for testing to determine suitable forging conditions and for forging. The density of these specimens ranged from 90% to 95% of the theoretical.

Testing to determine forging conditions was carried out on cylindrical billets of about 5 mm in diameter and about 10 mm in height under uniaxial compression. The testing was carried out in an argon atmosphere in a tungsten mesh heating element furnace fitted to an Instron Tester. The test billets were placed between two platens which were made of either graphite or thoriated tungsten. The temperature of the furnace was raised to the test temperature in 1 hour. Once the temperature equilibrated, the push rod or the top piston was moved at a constant displacement rate. Pistons were made of graphite. Except where the load exceeded the limit of the piston and platen assembly, tests were run up to 40 to 70% reduction in height. Load and displacement curves were recorded during a test. Runs were carried out at a plurality of temperatures and at constant displacement rates corresponding to a plurality of initial strain rates and the presence or absence of surface cracks were noted and the data was graphed with the results shown in FIG. 1. In FIG. 1 the solid filled in dots represent samples which displayed no cracks. The sample represented by cross in an open circle at 1210° C. could be strained to about only 25% reduction in height when the graphite platens fractured. The sample at 1110° C. was strained to only 9% reduction in height and the test stopped since stress rose beyond 300 megapascals. The specimens did not show any surface cracks under the test conditions shown in FIG. 1. On the contrary, any surface cracks present after the sintering step healed during forging. Thus, it was determined that fine grained zirconia could be forged at 1210° C.-1510° C. at strain rates of $1.4 \times 10^{-4}$ to $6.5 \times 10^{-3}$ seconds$^{-1}$ without the occurrence of surface cracks.

From the load-displacement curve of the tests, flow stresses were calculated as a function of strain. Flow stress versus temperature for different initial strain rates are presented in FIG. 2.

Figure 2:
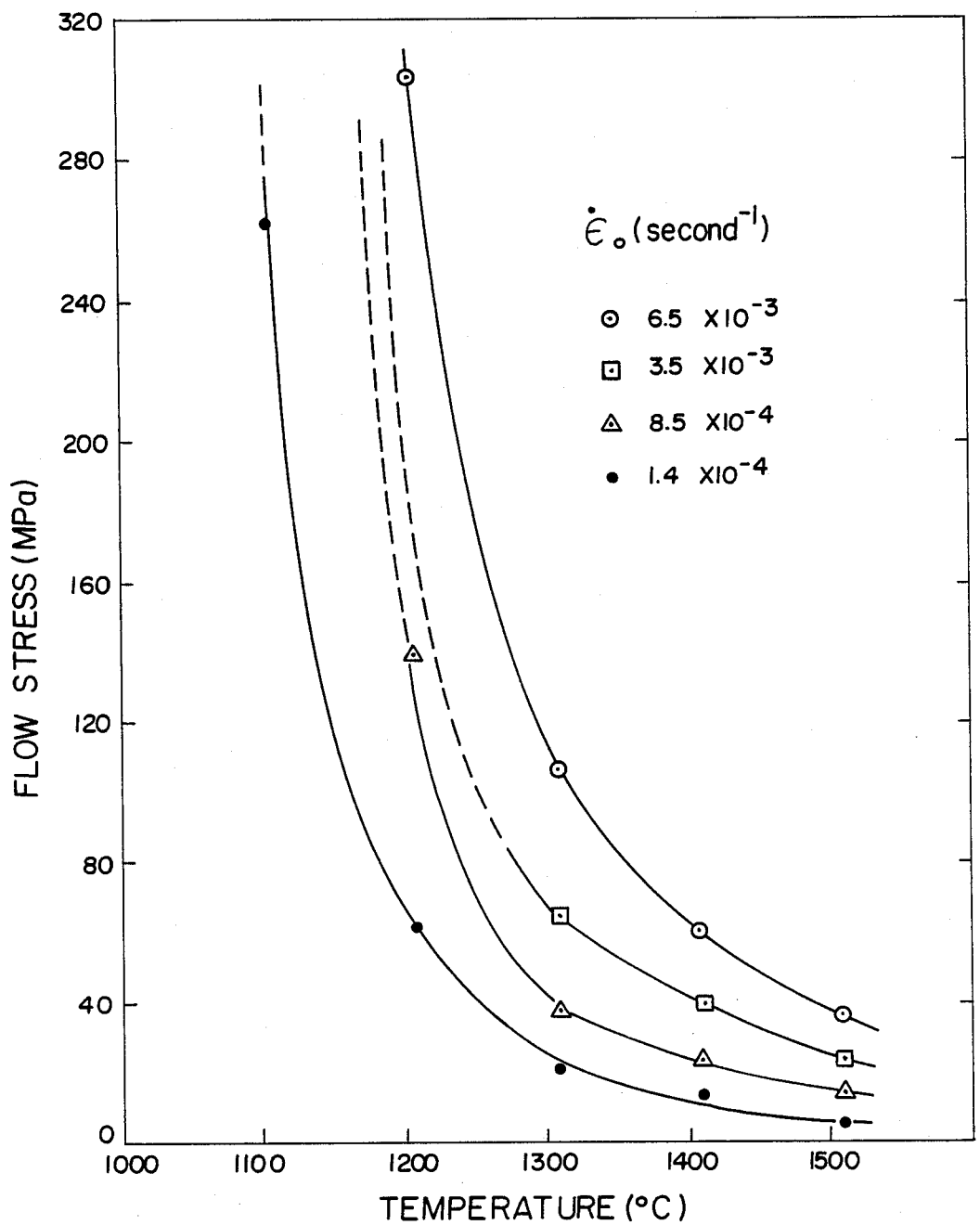
FIG. 2 is a graph of flow stress versus temperature at various initial strain rates and graphically presents results of the detailed working example herein.
Figure 3:
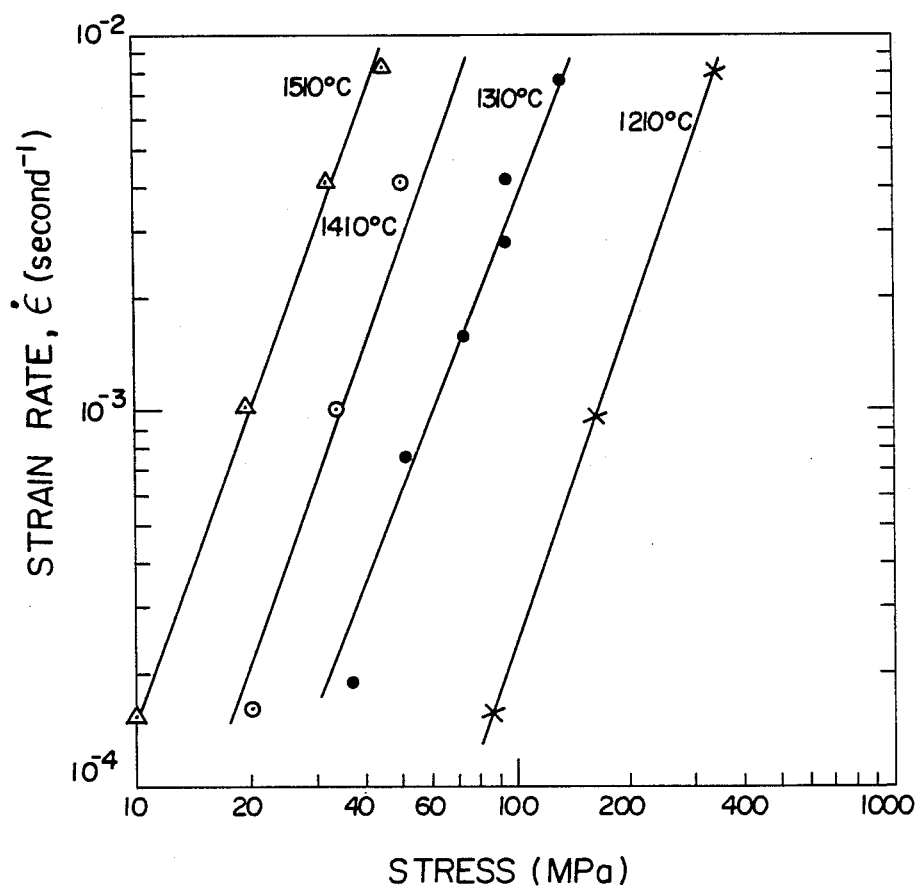
FIG. 3 is a graph of flow stress versus strain rate at a strain of $-0.2$ at various temperatures and graphically presents resultsof the detailed working example herein.

From FIG. 2 contours of constant flow stresses were plotted on FIG. 1. Flow stresses at a true strain = $-0.2$ were plotted against the corresponding strain rate in FIG. 3 on a log-log plot. In FIG. 3: for 1510° C., the slope of the line is 2.7; for 1410° C., the slope is 2.8; for 1310° C., the slope is 2.5; for 1210° C., the slope is 2.9. The average value of slope, which is the value of n in equation $\dot{\epsilon}=C\sigma^n$, of the curves at different temperatures is 2.7 indicating that the flow behavior was superplastic (i.e., criterion $1 \leq n \leq 4$ was satisfied).

Forging, i.e. step (d), was then carried out on the cylindrical preforms of about 14 mm in height and about 18.5 mm in diameter. Flat pancake shaped and lens shaped parts were formed. Temperatures and strain rates were so chosen that the load did not exceed the limit of the die assembly. The lens shape parts were forged at 1400° C. and at an initial strain rate of $6 \times 10^{-4}$ second$^{-1}$. The forging consisted of isothermal pressing in an open die in nominally pure argon. The die was made of graphite. Push rods were made of graphite. An Instron Tester fitted with a tungsten mesh element furnace was utilized for the forging. In the forging there was greater than 30% shear deformation.

A summary of results for the pancake shaped forgings is given in Table I below.

TABLE I

| Sample No. | Density of Sintered Preform (gm/cm³) | Forging Conditions | | Density of Forged Product (gm/cm³) |
| --- | --- | --- | --- | --- |
| | | Temperature (°C.) | Initial Strain Rate, (Second$^{-1}$) | |
| F-3 | 5.6 | 1410 | $6 \times 10^{-4}$ | 6.09 |
| F-4 | 5.6 | 1410 | $2 \times 10^{-4}$ | 6.09 |
| F-5 | 5.6 | 1410 | $2 \times 10^{-4}$ | 6.09 |
| F-6 | 5.6 | 1410 | $2 \times 10^{-4}$ | 6.09 |

The density of forged parts was about 6.1 megagram per cubic meter which is higher than the maximum value of 6.05 megagram per cubic meter obtained from sintering of TZ-3Y powder. At 20,000 magnification a scanning electron micrograph of a forged sample revealed a flaw free fully dense body.

The surfaces of the as-forged lens shaped parts as well as flat pancake shaped parts were smooth and had an excellent finish. All surfaces including the curved edges were free of microcracks.

Specimens for fracture strength measurements were cut from the forged specimens of Table 1. The forged shapes were split through the center parallel to the flat pressed surfaces. Each half was then ground to about 0.090 inches thick using a 320 grit diamond wheel. The diameter of each disk was about 0.900 inches. The disks were then tested using a piston on three ball test apparatus inside an Instron frame. The calculated strengths are shown for Samples F-3, F-4, F-5 and F-6 in Table II below.

TABLE II

| Sample No. | Diameter Inches | Thickness Inches | Strength PSI |
|---|---|---|---|
| F-3 | .890 | .090 | 133,890 |
| F-3 | .890 | .090 | 111,860 |
| F-4 | .930 | .090 | 119,850 |
| F-4 | .925 | .090 | 122,120 |
| F-5 | .927 | .090 | 135,830 |
| F-5 | .927 | .090 | 96,960 |
| F-6 | .922 | .086 | 113,386 |
| F-6 | .923 | .085 | 109,057 |

For samples F-3, F-4, and F-5, while the strengths are close to or exceed 100,000 psi (lbs. per square inch), it was felt that the coarseness of grinding affected the uniformity of results. The samples F-6 were polished on the tension surface to remove any potential flows due to grinding. As can be seen in Table II, the average strength for samples F-6 decreased slightly compared to the other samples but the variability of result was greatly reduced.

Other variations will be evident to those skilled in the art. Therefore the scope of the invention is intended to be defined by the claims.

What is claimed is:

1. A process for preparing polycrystalline zirconia ceramic parts which are relatively flaw free and which need little or no machining, said process comprising the steps of:
    (a) providing a starting powder comprising by weight from about 70% to 100% zirconia and from 0 to about 30% of additives,
    (b) cold pressing to obtain a preform of a green density ranging from about 30% of theoretical density to about 75% of theoretical density,
    (c) sintering in an inert atmosphere or in air or in vacuum at a temperature ranging from about 900° C. to about 1900° C. to obtain a density which ranges from about 50% to about 100% of theoretical density and which is higher than said preform green density, and
    (d) isothermally pressing in an open or closed die to substantially final shape in an inert atmosphere or in air or in a vacuum utilizing a temperature within the range of about 1000° C. to 1510° C. and strain rate within the range of about $10^{-7}$ to about 1 seconds$^{-1}$, the temperature and strain rate being such that surface cracks do not occur, said pressing being carried out to obtain a shear deformation greater than 30% whereby superplastic forging is effected.

2. A process as recited in claim 1 wherein the composition starting powder comprises by weight from about 80% to about 100% zirconia ($ZrO_2$) and from 0 to 20% of stabilizing additives selected from the group consisting of magnesia, yttria, calcia, rare earth oxides or mixtures thereof.

3. A process as recited in claim 2 wherein the cold pressing in step (b) is carried out to obtain a green density ranging from about 40% to about 65% of theoretical density.

4. A process as recited in claim 3 wherein the sintering in step (c) is carried out at a temperature ranging from about 1000° C. to about 1800° C. to obtain a density which ranges from about 75% to about 100% of theoretical density.

5. A process as recited in claim 4, wherein step (d) is carried out utilizing an open die.

6. A process as recited in claim 4, wherein step (d) is carried out in open or closed die by pressing utilizing a piston moved at a constant displacement rate such that the initial strain rate ranges from about $10^{-6}$ seconds$^{-1}$ to about 1 seconds$^{-1}$.

7. A process as recited in claim 1, wherein strain rate and temperature are selected based on testing of cylindrical preform samples having a diameter of 5 to 20 mm and a height of about 5 to 15 mm by isothermally pressing in an argon atmosphere or in air in a range of constant displacement rates and temperatures to reduce the height about 30 to 60% and determining which of the processed samples are free of surface cracks and graphing the results in terms of initial strain rates versus temperature and selecting strain rates and temperatures in the area of the graph where the processed samples did not exhibit surface cracks.

8. A process as recited in claim 1 wherein the conditions of step (d) are selected empirically.

9. A process as recited in claim 1, wherein step (d) is carried out utilizing a temperature within the range of about 1210° C. to about 1510° C. and strain rate within the range of about $1.4 \times 10^{-4}$ to about $6.5 \times 10^{-3}$ seconds$^{-1}$.

10. A process as recited in claim 1 wherein the temperature utilized in step (d) ranges from about 1000° C. to 1410° C.

* * * * *